Jan. 23, 1923. 1,443,037
J. H. PARSONS ET AL.
CHILD'S VEHICLE.
ORIGINAL FILED APR. 30, 1921.
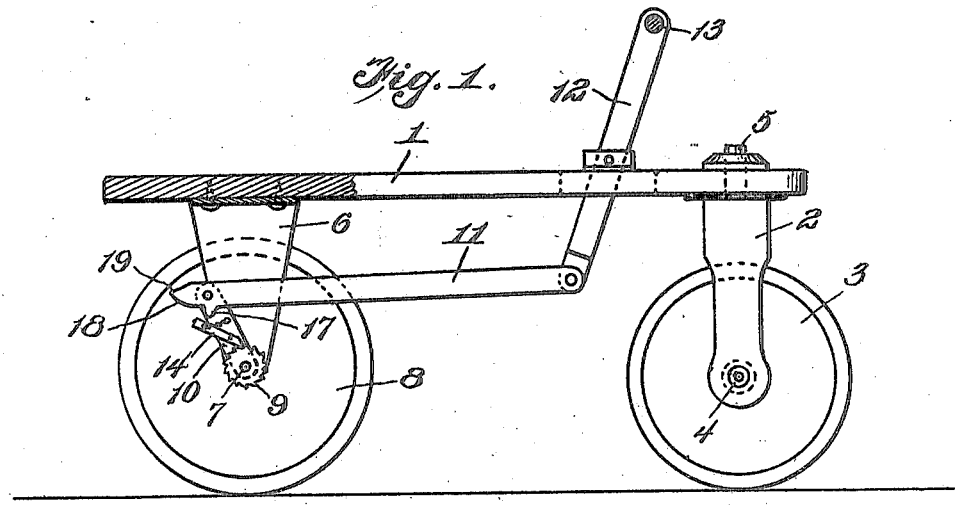
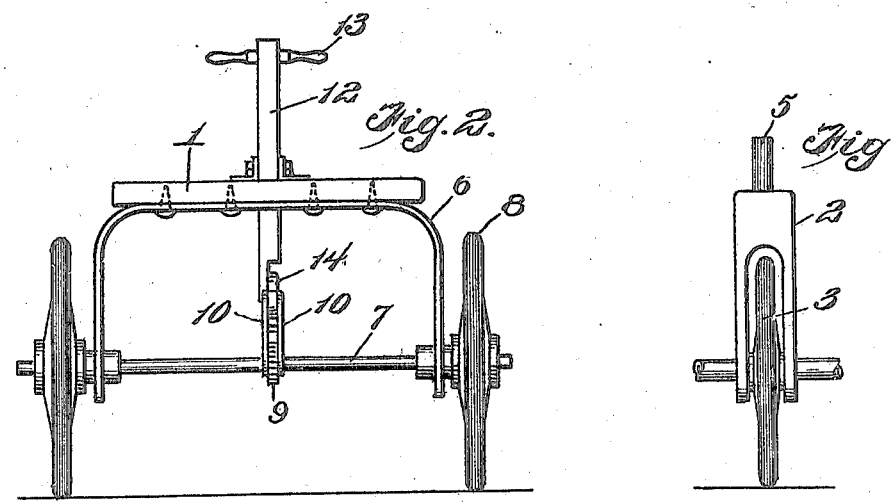
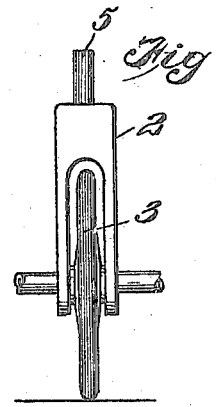
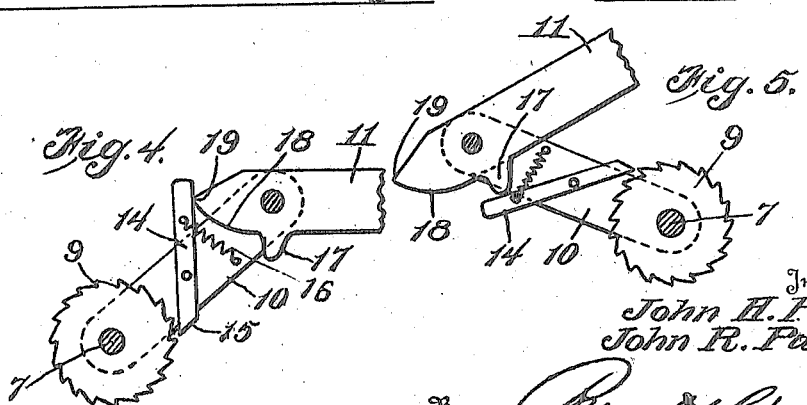
Inventor
John H. Parsons
John R. Parsons
By 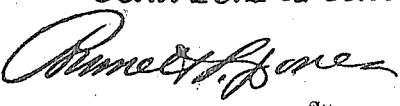
Attorney Patented Jan. 23, 1923.

1,443,037

UNITED STATES PATENT OFFICE.

JOHN H. PARSONS, OF RIDLEY PARK, PENNSYLVANIA, AND JOHN RAYMOND PARSONS, OF WILMINGTON, DELAWARE, ASSIGNORS OF ONE-HALF TO JOSEPH H. HINKSON, OF RIDLEY PARK, PENNSYLVANIA.

CHILD'S VEHICLE.

Application filed April 30, 1921, Serial No. 465,803. Renewed August 12, 1922. Serial No. 581,490.

*To all whom it may concern:*

Be it known that we, JOHN H. PARSONS and JOHN RAYMOND PARSONS, citizens of the United States, residing at Ridley Park, county of Delaware, and State of Pennsylvania, and Wilmington, county of New Castle, and State of Delaware, respectively, have invented new and useful Improvements in Children's Vehicles, of which the following is a specification.

This invention relates to children's wheeled vehicles of the lever-propelled type, and especially to vehicles driven through the instrumentality of pawl and ratchet mechanism actuated by an operating lever.

The object of the invention is to provide a pawl and ratchet drive gearing, for vehicles of the class described, whereby the gearing may be thrown out of operation whenever desired to enable the vehicle to freely run backward or forward without motion of the drive gearing, the construction being such as to enable this to be done by prescribed movements of the operating lever.

The invention consists of the features of construction, combination and arrangement of parts, hereinafter fully described and claimed, reference being had to the accompanying drawing, in which:—

Figure 1 is a sectional side elevation of a form of wheeled vehicle embodying our invention.

Figure 2 is a rear end elevation of the same.

Figure 3 is a view of the front axle bracket and wheel.

Figures 4 and 5 are detail views showing the pawl releasing actions at the limits of the backward and forward strokes of the operating lever.

The invention is shown as applied in the present instance to a wheeled vehicle of that type comprising a body or platform board 1 carrying at its forward end a wheel supporting bracket 2 bifurcated to receive a front wheel 3 mounted on an axle 4 journaled in bearing members or bearing openings provided upon or formed in the bracket arms. The upper end of the bracket 2 carries a stem or spindle 5 which extends upward through an opening in the board or platform 1 and is mounted to turn therein for steering movements of the wheel 3. Any suitable means for imparting steering motion to the bracket 2 and wheel 3 may be provided, if desired. At its rear the board or platform 1 is supported by an inverted U-shaped bearing bracket 6, the arms of which are provided with bearings at their lower ends for a rear transverse drive shaft 7 carrying rear supporting and drive wheels 8.

Fixed to the shaft 7 is a ratchet wheel 9 and loosely mounted at one end upon said shaft so as to rock in a forward and rearward direction is a crank link 10 pivotally coupled at its opposite end to the rear end of a connecting rod 11 so as to be actuated by said rod in the forward and rearward movements of the latter. The rod 11 is pivotally coupled at its forward end to the lower end of an operating lever 12 which is pivotally mounted intermediate of its ends to the board or platform 1 and extends upwardly through an opening in said platform. At its upper end the lever is provided with suitable handles 13 whereby it may be swung backward and forward on its pivot for the purpose of communicating forward and backward motion through the connecting rod 11 to the crank member 10.

Carried by the crank member 10 is a pawl or dog 14. This pawl or dog comprises a bar-like member pivotally mounted intermediate its ends upon one side of the crank member 10 and pivoted at its lower end to form a tooth 15 for engagement with the teeth of the ratchet wheel 9, the construction being such that on the forward movement of the crank link 10 the tooth 15 will engage the shoulders of the teeth of the wheel 9 and impart forward driving motion to the vehicle, while on the rearward swinging movement of the crank link 10 the tooth 15 will ride over the inclined surfaces of said ratchet teeth for an idle or inactive motion on said rearward swinging movement of the crank link 10. A coiled spring spring 16 connects the upper end of the pawl 14 with the crank link 10 and exerts its contractile energy to hold the toothed end 15 of the pawl in engagement with the teeth of the ratchet wheel except at such time as when the pawl is forcibly held out of engagement with the ratchet wheel.

Provided upon the connecting rod 11 is a trip projection 17, and also provided upon said connecting rod is a curved or inclined cam surface 18 terminating in a point or projection 19. The said projection 17, cam surface 18 and point 19 are suitably formed to hold the rear end of the connecting rod in position for cooperation with the pawl 14 at prescribed points in the backward and forward movements of the connecting rod.

When the connecting rod is moved forward by backward motion of the upper end of lever 12 the toothed end 15 of the dog will engage the shoulders of the ratchet teeth and impart forward driving motion to the vehicle until, at the limit of forward motion of the rod 14, the cam surface 18 rides over the upper end of the dog 14 and the point 19 engages the upper surface of such end of the pawl to swing the same rearwardly and thus move the tooth 15 out of engagement with the teeth of the ratchet wheel. In this position of the pawl, which may be maintained by allowing the lever 12 to remain as it was at the time of disengagement, the pawl will be held out of engagement of the ratchet wheel, thus enabling the rider to move the vehicle either backward or forward freely and without resistance from the drive gearing and without moving the driving parts thereof. Similarly, when the upper end of the lever 12 is moved forwardly to the limit of its motion, and the connecting rod 11 is moved rearwardly to the limit of its motion, the projection 17 will engage the upper end of the dog 14 and move the toothed end thereof out of engagement with the teeth of the ratchet wheel, which position may be maintained by leaving the lever 12 in its set position, thus allowing the vehicle to be moved forward or backward without resistance from the drive mechanism and without actuating the working parts thereof. In the normal operation of the drive gearing, when the lever 12 is moved backward and forward, the releasing actions above described occur momentarily and to such a slight extent as to not interfere with the proper driving motion of the pawl and ratchet mechanism in propelling the vehicle forwardly.

It will thus be seen that our invention provides a pawl and ratchet drive mechanism of a simple type, which may be easily and cheaply manufactured, and by means of which the vehicle may be driven in the usual manner and also by means of which the pawl or dog of the driving mechanism may be thrown out of action by simply moving the operating lever to the limit of its forward or rearward stroke, thus enabling the drive mechanism to be thrown out of action for as long or as short a period as desired so that the user of the vehicle may move the vehicle back and forth without interference with the drive mechanism and without actuating the same. This allows the vehicle to be backed or moved forward any distance in a ready, easy and convenient manner and without restriction from the drive mechanism or imposing strains thereon. The principle of the invention may, of course, be applied to any type of toy or child's vehicle and the construction may be such as to adapt the pawl to be thrown out of action at either the forward or rearward limit of stroke of the operating lever or at the limit of each stroke (backward and forward) as disclosed in the present embodiment of the invention.

Having thus fully described our invention, we claim:

1. In a drive gearing for vehicles, a pivoted actuating lever, a ratchet wheel, a swinging crank, a spring actuated pawl carried by the crank for engagement with the ratchet wheel, a connecting member between the pivoted actuating lever and the swinging crank, and means carried by the connecting member for releasing the pawl from engagement with the ratchet wheel at the end of a stroke of said connecting member.

2. In a drive gearing for vehicles, a ratchet wheel, a swinging crank, a pawl carried by the crank to engage the ratchet wheel, a pivoted operating lever, a connecting member between the operating lever and the crank, and means carried by said connecting member for releasing the pawl from engagement with the ratchet wheel at each end of the stroke of the actuating lever.

3. In a drive gearing for vehicles, a ratchet wheel, an actuating device, a swinging crank, a spring actuated pawl carried by the crank for engagement with the ratchet wheel, a connecting member between the actuating device and the swinging crank, and a contact formed on said connecting member for engaging and releasing the pawl from the ratchet wheel at the end of a stroke of said connecting member.

4. In a drive gearing for vehicles, a ratchet wheel, a pawl acting thereon, and means for actuating the pawl, said means embodying means for releasing the pawl from engagement with the ratchet wheel at the end of a stroke of said actuating means.

5. In a drive gearing for vehicles, a ratchet wheel, a pawl to act upon the ratchet wheel, and actuating means for operating the pawl, said actuating means including contact members carried thereby for engaging and releasing the pawl from the ratchet wheel at the end of each stroke of said actuating means.

6. In a drive gearing for vehicles, a shaft, a ratchet wheel fixed thereon, a crank pivotally mounted on the shaft, a spring actuated pawl carried by the crank to engage the ratchet wheel, a swinging actuating lever, a connecting rod between said lever and the swinging crank, and a projection upon said rod to engage the pawl and release the same from the ratchet wheel at the end of a stroke of said actuating lever.

7. In a drive gearing for vehicles, a shaft, a wheel on said shaft, a crank pivotally connected with said shaft, a contact member carried by said crank to engage and bind with the wheel when the crank is moved in one direction and to idle thereon when moved in the opposite direction, a rod connected to said crank, and stops on said rod moving into engagement with said contact member when the crank nears its limit of movement in either direction to lift the contact member from engagement with said wheel.

In testimony whereof we affix our signatures.

JOHN H. PARSONS.
JOHN RAYMOND PARSONS.